Oct. 27, 1959          F. M. JOHNSON          2,910,255
JETTISONABLE AIR STAIR DOOR
Filed May 28, 1957          6 Sheets-Sheet 4
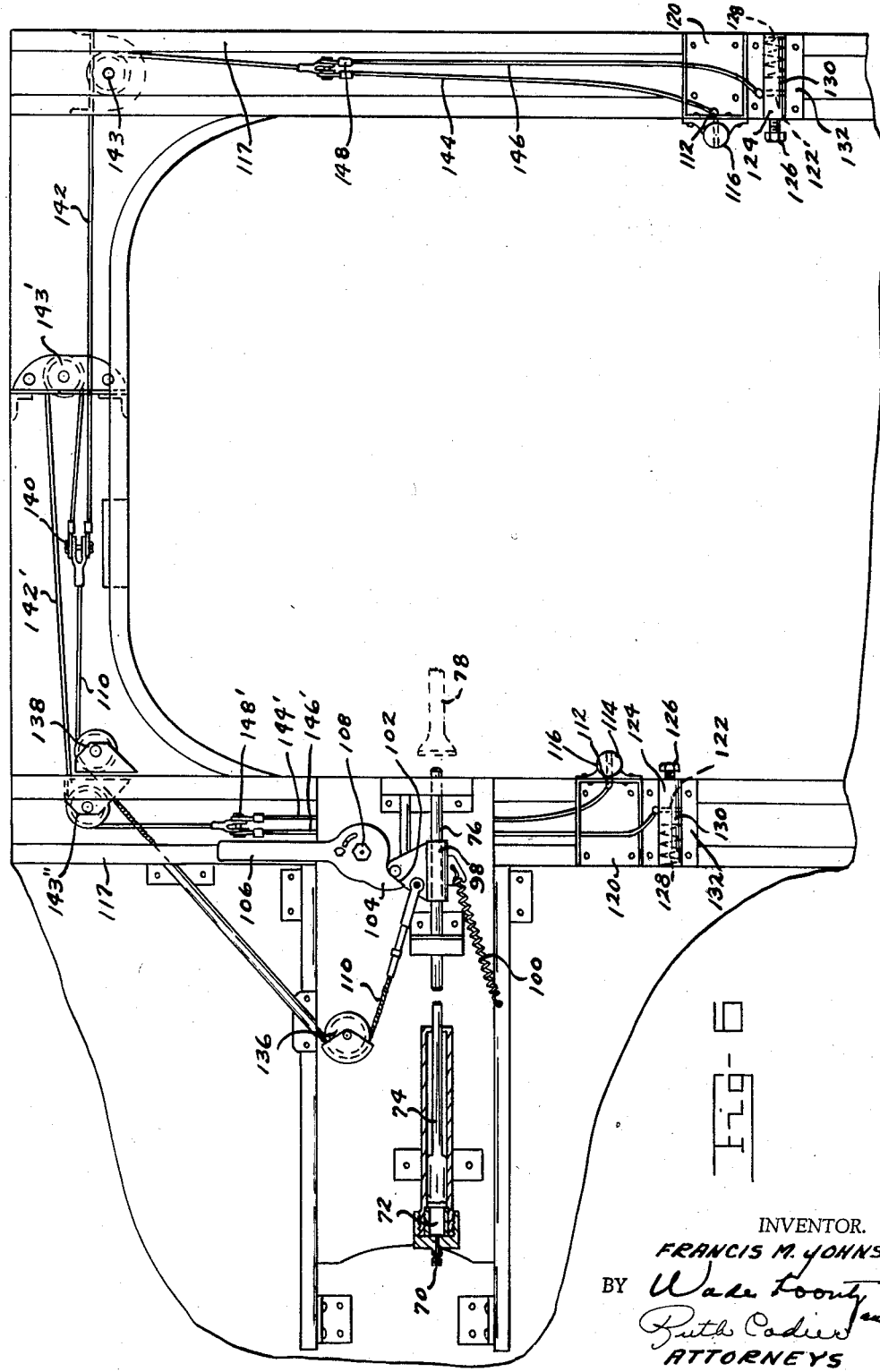
INVENTOR.
FRANCIS M. JOHNSON
BY
ATTORNEYS Oct. 27, 1959  F. M. JOHNSON  2,910,255
JETTISONABLE AIR STAIR DOOR
Filed May 28, 1957  6 Sheets-Sheet 5
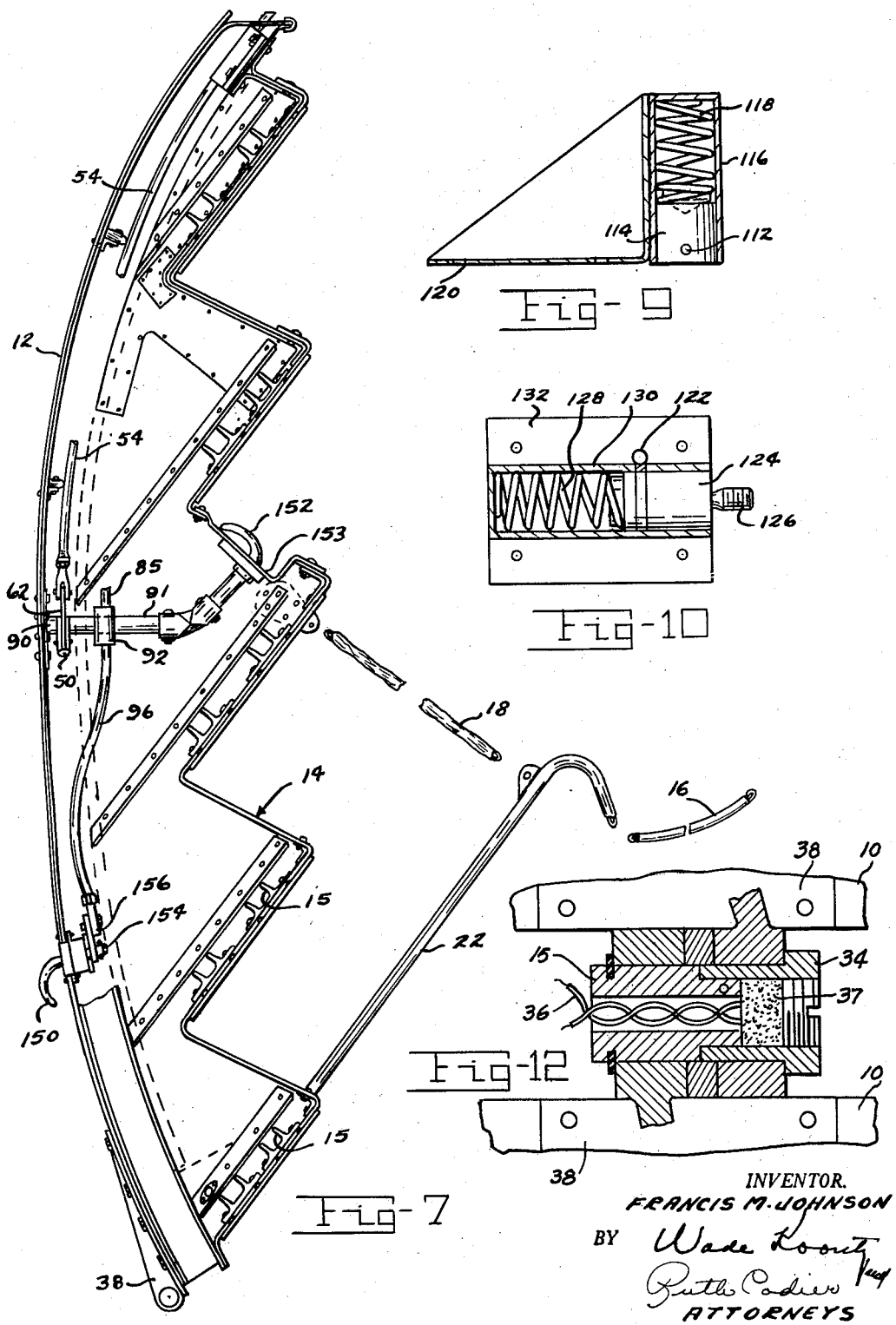
INVENTOR.
FRANCIS M. JOHNSON
BY Wade Koontz
Ruth Codier
ATTORNEYS

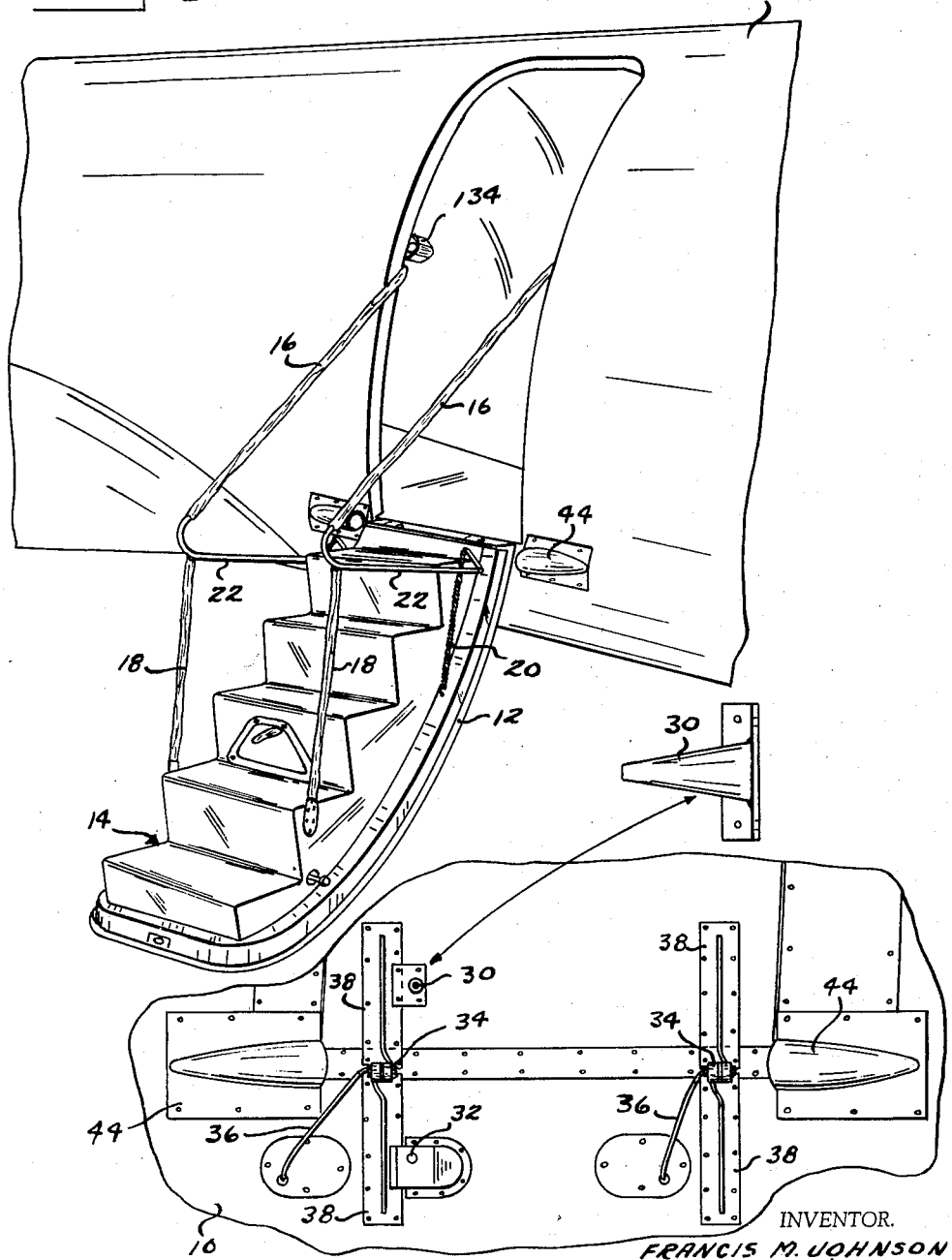

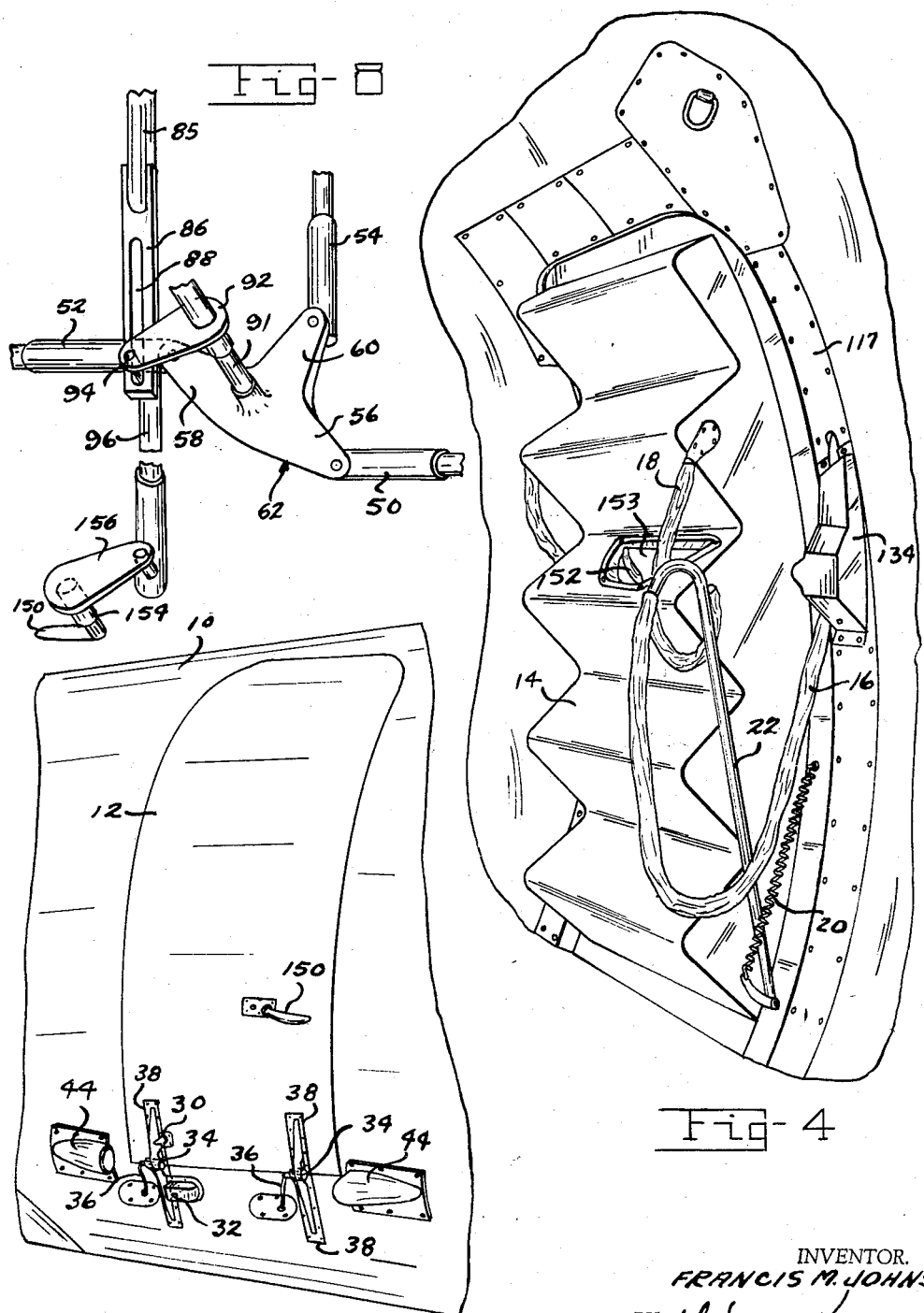

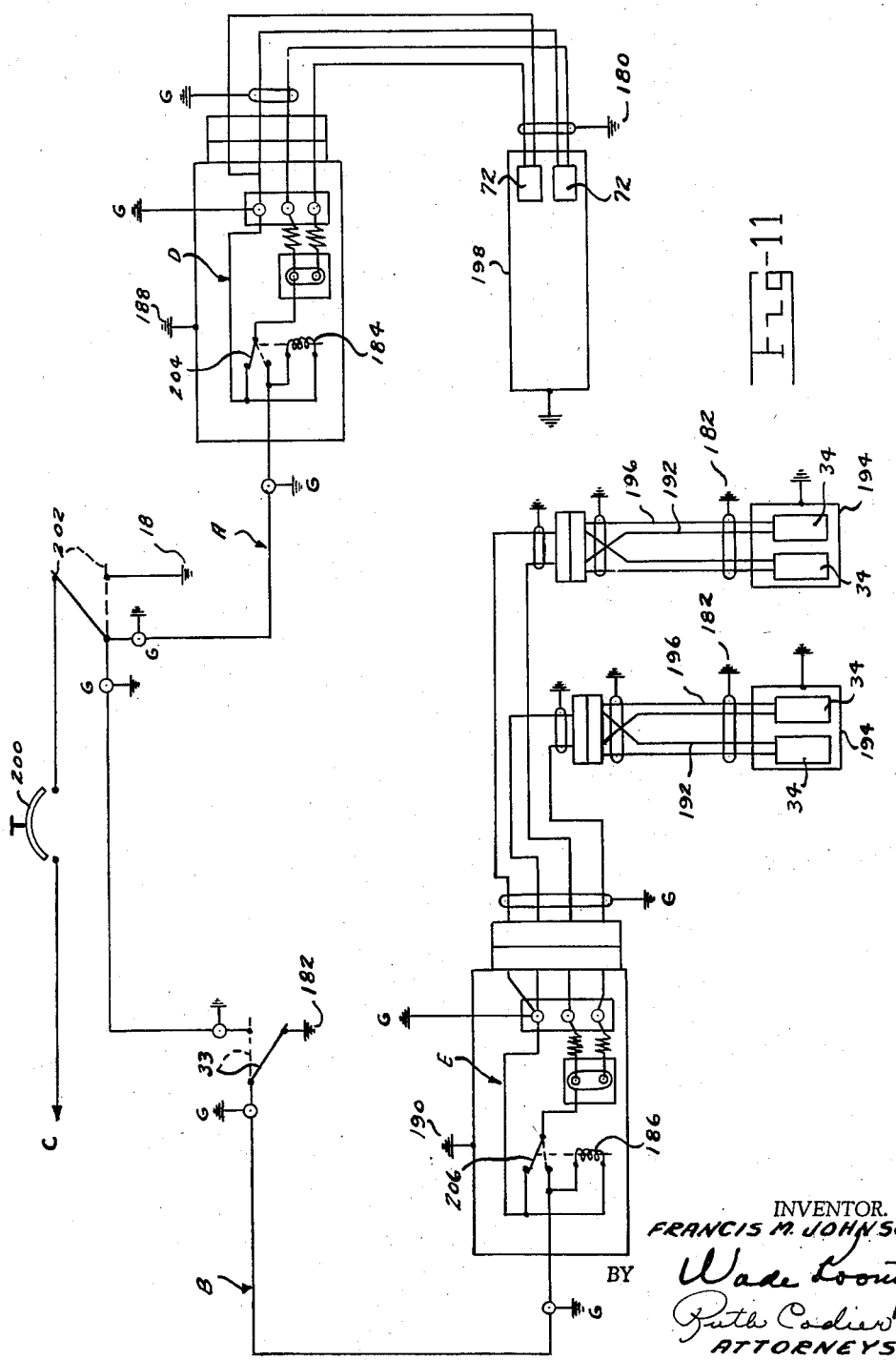

United States Patent Office 2,910,255
Patented Oct. 27, 1959

2,910,255

JETTISONABLE AIR STAIR DOOR

Francis M. Johnson, Dayton, Ohio, assignor to the United States of America as represented by the Secretary of the Air Force Application May 28, 1957, Serial No. 662,302

9 Claims. (Cl. 244—129)

(Granted under Title 35, U.S. Code (1952), sec. 266)

The invention described herein may be manufactured and used by or for the United States Government for governmental purposes without payment to me of any royalty thereon.

This invention relates to a jettisonable air stair door and, more particularly, to a normally operable door or aircraft closure, which is equipped with emergency means for completely freeing the door opening for emergency bail out of passengers and personnel.

When trouble is encountered in the air, and it is necessary for passengers and personnel to leave the aircraft during flight, any normal door, which would be lowered to allow bail out would be lowered into the airstream, and cause undesirable drag. In addition, it would be in the way of the personnel as they left the aircraft, seriously hindering their successful exit.

The present invention has for its object the provision of means completely and thoroughly worked out, for jettisoning a stair door or any aircraft closure in an emergency during flight when it is necessary for personnel to bail out.

A further object of the invention is the provision of the above means for emergency jettison, along with normal means for normally opening, lowering and closing the stair door, either from the inside or the outside, without triggering or affecting the emergency device.

For implementing the system, a further object of the invention is the provision of thrust means, operated either explosively or manually, which impinges upon and actuates mechanism for withdrawing the latch bolts from the door.

A further object of the invention is the provision of means actuated by the mechanism, which impels the thruster, to push the door outward.

A further object of the invention is the provision of means actuated by the mechanism which impels the thruster for releasing the stair handrail so that the door may swing downwardly past its normal arc until it contacts the fuselage.

A further object of the invention is the provision of an electrical means mounted on the face of the fuselage, which, when contacted by the downwardly swinging door, energizes explosive squibs to release the hinge bolts and jettison the door.

A further object of the invention is the provision of normally operated means for opening, lowering and closing the door for normal ingress and egress of passengers and personnel while the aircraft is on the ground, this means being operated both from the inside of the door when closed, and the outside of the door when the aircraft is on the ground without interfering with or disturbing or triggering any of the emergency mechanism.

A further object of the invention is the provision of a safetied electrical circuit for preventing inadvertent firing of the explosive squibs due to radiation, static, electrical, leakage, or any other inadvertent cause.

Further objects and advantages will become apparent as the description proceeds.

In the drawing,

Fig. 1 is a perspective view of a portion of an airplane fuselage with the door attached and in normal open position for ingress or egress of passengers.

Fig. 2 is a detail view of the lower portion of the door, together with the adjacent portion of fuselage showing the door in closed position.

Fig. 3 is an outside view of the door and adjacent fuselage, showing the door in closed position.

Fig. 4 is an interior perspective view of the door and stair in closed position.

Fig. 6 is a view from the inside of the upper portion of the door jamb.

Fig. 7 is a side elevation of the door and stair, with the side housing removed.

Fig. 8 is a perspective view of the bell crank and a portion of the linkage.

Fig. 9 is a cross sectional detail view of the door kicker.

Fig. 10 is a cross sectional detail view of the handrail release means.

Fig. 11 shows the wiring diagram, including specifically the safety measures employed for preventing accidental explosion of the emergency explosive means.

Fig. 12 is a detailed cross-sectional view of the explosive bolt shown in Fig. 2.

Figure 5:
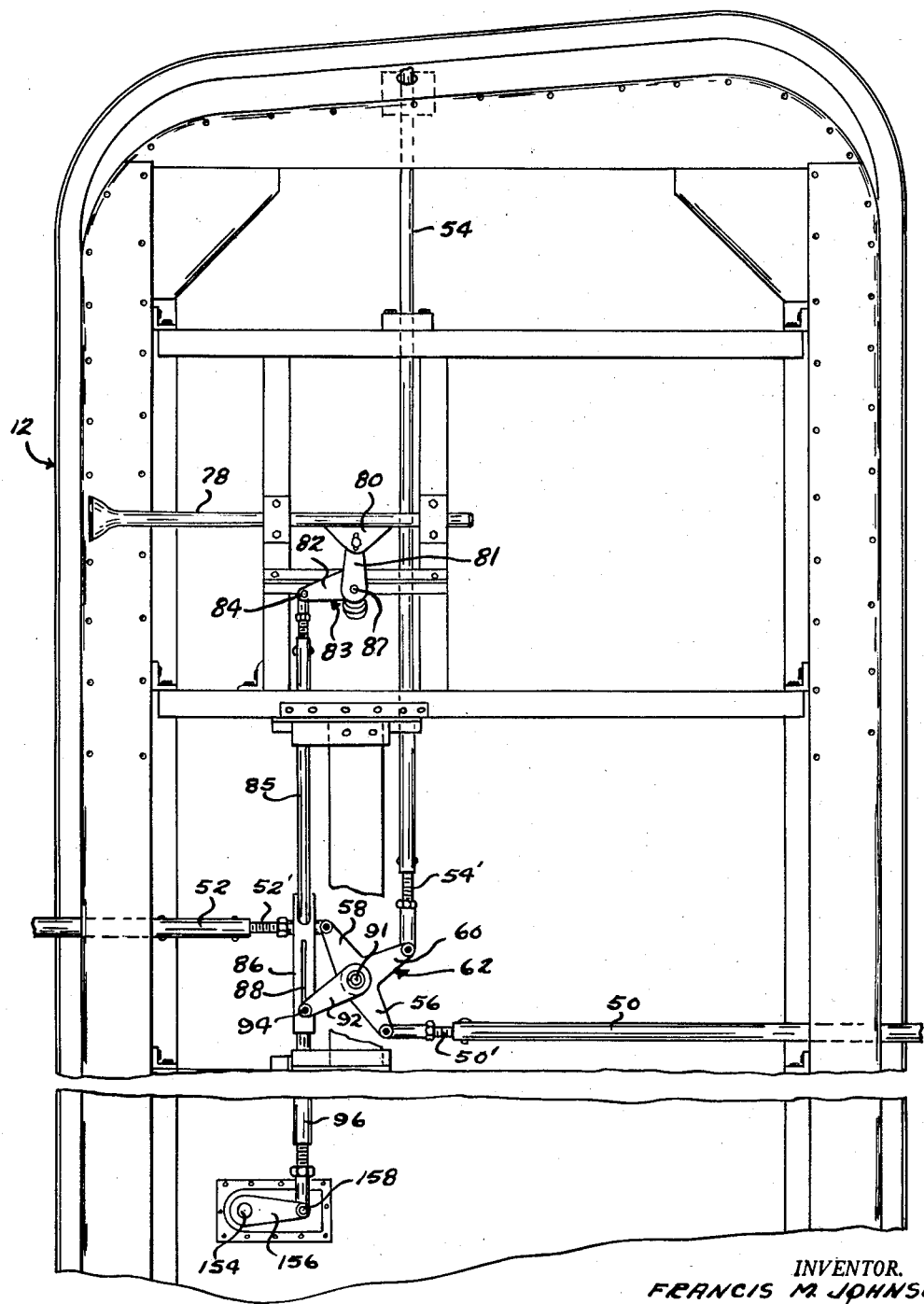
Fig. 5 is a fragmentary inside view of the door in closed and latched position, with the stair removed.

Referring more in detail to the drawing, an aircraft body or fuselage is represented by the numeral 10. A door 12 is hinged at its lower edge to the fuselage, and has a curved contour to conform to the contour of the fuselage. A set of stair steps 14 is bolted, or otherwise secured to the interior of the door 12, and is a movable, integral part of it. The stair 14 is reinforced by the stiffening members 15 (Fig. 7). The stair door, when in normal open position, has a pair of handrails 16, which are pliable, foldable chains or cables, and are retained in handrail position by cable chains 18, a pair of springs 20, and a pair of curved rods 22. The cables or handrails 16 are releasable from the aircraft in a manner later described, and fall away with the stair, when emergency jettison takes place.

A pin or striker 30 is mounted on the exterior surface of the door in such position in the lower area that when the door is swung open in an emergency operation during flight, and past its normal arc, the pin or striker 30 contacts a microswitch trigger 32. The microswitch closes a circuit, as shown at 33 in the wiring diagram of Fig. 11. The lead wires 36 (Figs. 2, 3 and 12) are a part of this circuit. Explosive squibs are ignited, exploding the bolts 34 from the hinges 38. A bolt catcher 44 is secured to the fuselage on either side of the door for stopping the separated bolts, and preventing injury to the aircraft.

The explosive is of any standard design, the one shown being composed of slidingly interfitting sections 34 and 35, and an explosive charge 37.

Referring now particularly to Fig. 5, the door 12 is held tightly in locked position by three latch bars, bars 50 and 52 engaging the door jamb on either side of the door, and bar 54 engaging it at the top.

The three latch bars 50, 52 and 54 are adjustable in length, as shown at 50', 52' and 54'. They may be curved to accommodate the curvature of the fuselage. They are pivotally attached at their inner ends to the three prongs 56, 58 and 60, respectively, of a bell crank 62. It will be seen that the rotation of the bell crank about its pivotal center will move the latch bars to engage or to disengage the door jamb, thereby locking the door or unlocking it. Both normal and emergency means are provided for this purpose.

The emergency means are shown in Figs. 5 and 6. When a jettison button (not shown) is operated, an electric impulse is brought in from a battery or other source, via the conductor 70 to the chamber 72, which is located to one side of the interior of the door, an explosive squib in the chamber 72 impels a piston rod 74 to the right, as shown in Figs. 5 and 6, striking the rod 76 which impels a thruster 78 to the right. The thruster 78 has attached thereto and movable therewith a downwardly extending bracket 80. Arms 81 and 82 extending rigidly at a substantial right angle to each other form a bell crank 83, which has a stationary pivot 84. The arm 81 has pivotal and slight sliding connection with the bracket 80. The arm 82 has pivotal connection at 87 with the upper end of a rod 85.

The rod 85 is connected to the bell crank 62 in the following manner: The lower end of the rod 85 terminates in a strap member 86, which is provided with a slot 88. The bell crank 62 is supported on the door 12 at its pivotal center by a journal 90 (Fig. 7). A rod member 91 also at the pivotal center of the member 62 extends normally therefrom. A link member 92 is rigidly connected to the rod 91, and lies in a plane parallel to and spaced from the plane of the bell crank 62. The link 92 is provided with a pin extending normally therefrom and engaging in the slot 88 of the rod 85.

The operation of the explosive means for withdrawing the latch bars will now be apparent. The travel of the thruster 78 to the right, as shown in Fig. 5, rocks the bell crank 83 about its pivot 87, raising the arm 82, and with it the pivoted rod 85. It will be noted that the point of connection of the slotted member 86 with the member 92, and also with a downwardly extending rod member 96, whose function will later be explained, is spaced a transverse distance from the bell crank 62. The pin 94, resting at the base of the slot 88, is moved upwardly, rocking the bell crank clockwise, as shown in Figs. 5 and 8, and the latches are withdrawn.

In the event that the button or switch means fails to explode the squib in the chamber 72, or for any other reason the explosive device just described fails to operate, manual means are provided for setting the emergency device into operation. Referring to Fig. 6, a sleeve bracket 98 is rigidly attached to the rod 76 to move with it. A spring 100, attached to the bracket 98 biases the rod 76 to the left, as shown in Fig. 6, and out of contact with the thruster 78. The bracket 98 has an upwardly extending cam portion 102 which lies in operating contact with a lug 104 on the handle 106. When the handle 106, which is pivoted at 108, is swung to the left as shown in Fig. 6, the lug 104 is operated against the bias of the spring 100 to push the rod 76 to the right, striking the thruster 78, operating the latch bars to unlatch the door as described above.

After the door has been unlatched, it may not swing free of the door jamb. A thruster mechanism is therefore provided to push the door outwardly. This means is brought into operation by the movement of the rod 76, however it is impelled. A cable 110 is anchored to the bracket 102 and, through a pulley and cable system, withdraws the restraining pins 112 from a spring impelled kicker 114, see Fig. 6 and Fig. 9. The kicker in its restrained position, is contained in a housing 116. The housing 116 containing also the spring 118 is attached to the aircraft door frame 117 by means of the bracket 120. The kicker lies in contact with or near to the interior surface of the door. When the restraint is released, the door is pushed forcefully outwardly.

The pulley system, actuated by the movement of the rod 76, also withdraws the restraining pins 122 from the spring impelled plunger 124. One end of the handrail 16 is secured to the plunger 124 by any expedient means, such as the screw indicated at 126 in Figs. 6 and 10. The spring 128 with the plunger 124 is contained in a housing 130, which is secured to the aircraft door frame 117 by the bracket 132. Both the door kicker and the handrail release device are protected by a housing 134, see Fig. 4.

The pulley and cable system, by which the door kicker and the handrail release are operated, is as follows.

The cable 110 rides over the pulleys 136 and 138, located at the sides and top of the door frame, respectively. The cable 110 is divided by a bifurcated bracket 140 into segments 142 and 142', riding over pulleys 143' and 143 located respectively at the side and top center of the door frame 117. The segments 142 and 142' are each again divided into the two segments 144, 146 and 144', 146' by brackets 148 and 148'. A pull on these cable segments operates to pull the restraining pins 112 and 122, as described above.

Thus far, the emergency operation of the device has been described. It is to be understood that the door and stair can be opened, lowered, and closed normally, for the normal ingress and egress of passengers and personnel, while the aircraft is on the ground, leaving the emergency mechanism intact. The latch bars are operated for normal locking or unlocking by means of either of the two handles 150 or 152, located at the exterior and interior of the door, respectively. The pivot rod 154 of the handle 150 is rigidly connected to a lever link 156, which in turn has connection to the rod 96. A sliding connection between the rod 96 and the rod 85 is accomplished by means of the pin 94 attached to the rod 96, and slidably engaged in the slot 88. When the door handle 150 is turned, the link 156 rotates about the pivot 154 in a counterclockwise direction, as shown in Figs. 5 and 8, raising the rod 96 in an upward direction.

The pin 94 rides up in the slot 88. This is very important. This is the device which allows the normal operation of opening and closing the door without disturbing the emergency mechanism. The rod 85 always stays in position, except for a slight lateral movement as it pivots about the pivot point 87. The lever link 92 is rotated about the pivot rod 91, operating the bell crank 62 to withdraw the latch bolts 50, 52 and 54, and allow the door to be opened.

The interior handle 152 is shown located in a well 153 in one of the steps. It could be placed at any expedient location. Its connection to the bell crank operating pivot rod 91 is shown in Figs. 7 and 8.

The safety shielding system is shown in the wiring diagram in Fig. 11. The circuits A and B, leading to squibs 72 and 34, respectively are shielded and in all normal conditions, grounded at 180 and 182, respectively. The relays 184 and 186 are grounded at 188 and 190, respectively. These relay circuits thus protect circuits A and B from extraneous currents and static charges originating from outside sources. The squibs or explosive charge 37, the conductors 192 and 196 adjacent and the squibs 72 are additionally protected by grounded metal shells indicated at 194 and 198, respectively. In addition, shielding and grounds indicated by the letter G are provided at points throughout both circuits.

The first operation in an emergency consists in closing the safety switch 200. The switch 202 is then operated (by means not shown) to dotted line position, removing the ground from the circuit B, and connecting it to the energy source entering at C. When this circuit is closed, the relay switch 204 is moved to the dotted line position. This switch, which has maintained a short circuit indicated at D, now closes the circuit through the squibs 72, exploding them. The stair door is opened and swung downwardly, as above described, contacting the microswitch trigger 32. The circuit B is thereby taken off the ground 182, and connected to the power source C. The relay switch 206, which has maintained the short circuit indicated at E, now closes the circuit to the charges 37 exploding them and severing the components 34 and 35 of the hinge bolt.

It will be noted that, as a precautionary measure, two squibs 34 have been provided for each hinge bolt, and two squibs 72 for the thruster.

While the invention is shown and described in connection with one form for illustrative, rather than restrictive purposes, it is obvious that changes and modifications may be made by those skilled in the art without departing from the scope and spirit of the invention as defined in the accompanying claims.

I claim:

1. In an aircraft, a fuselage having a door opening, a stair door, hinge bolts connecting said door to the lower jamb of said door opening, releasable latches releasably securing said door to the side jambs of said door opening, means for manually opening and lowering said door for normal ingress and egress of personnel, emergency means independent of said first mentioned means for releasing the latches of said door while the aircraft is in flight, said emergency means also releasing a spring activated kicker to push the door outward, explosive means for explosively removing the hinge bolts of said door, a trigger for said explosive means located on the exterior of the fuselage of said aircraft below said door, and contactable by said door as it swings downwardly to energize said explosive means.

2. In an aircraft, a fuselage having a door opening, a stair door connected by hinges to the jamb of said opening providing both a closure for said opening during flight and a stair when the aircraft is landed, latch bars on said door, for engagement with the jamb of said door opening to maintain the door in closed position, explosive bolts in the hinges of said door, means manually operable both from the inside and the outside of the door to withdraw the latch bars from engagement with the door jamb and lower the door for normal ingress and egress of personnel, explosively operated emergency means for withdrawing the latch bars from engagement with the door jamb while the aircraft is in flight, a pair of spring impelled kicker plungers operable to push the door free of the door jamb, restraining means for said kicker plungers, said explosively operated means operating also to remove said restraining means so that the door is pushed outwardly from the door jamb, an electric trigger for exploding said explosive bolts located on the outside of the fuselage of said aircraft and operated by contact of the downwardly swinging door.

3. In an aircraft, a door fitted into a door opening in the body of said aircraft, a plurality of latch bars on said door adapted to engage the jamb of said door opening, for holding said door in closed position, a bell crank having a plurality of prongs, means for pivotally attaching each prong of said bell crank to one of said latch bars, emergency means explosively operated for operating said bell crank to withdraw said latch bars and release said closure, means on the outside of said closure and means positioned inside the closure for manually and normally operating said latch bars to open said closure in manual operation, said emergency means and said normal means having pivotal and sliding interengagement so that either of said normal operating means may be operated leaving said emergency operating means intact and undisturbed.

4. In an aircraft a fuselage having an egress opening, a jettisonable closure for closing said opening, hinges for hinging said closure to said fuselage, explosive bolts in said hinges, trigger means for exploding said explosive bolts and freeing said door from said aircraft, said trigger means being located on the exterior of said fuselage, and below the door, and being operable by contact of the door with said trigger when said door is opened and swung downwardly.

5. In an aircraft, a fuselage having an opening, a jettisonable door for closing said opening, hinges for hinging said door to said aircraft, explosive bolts in said hinges, trigger means for exploding said explosive bolts and freeing said door from said aircraft, said trigger means being located on the exterior of said body, and below the door, and being operable by contact of the door with said trigger when said door is opened and swung downwardly, bolt catchers located on either side of said door on the exterior of the aircraft for catching the explosive bolts after their release, for protection of the aircraft from damage therefrom.

6. In an aircraft, a fuselage having a door opening, a jettisonable door hinged to the jamb of said door opening, latch bars on said door engageable with the jamb of said door opening for holding said door in closed position, spring operated thrusters located on said door jamb for pushing said door outwardly, restraining means for said thrusters, explosively operated means for withdrawing said latch bars to release said door, said explosively operated means also operating to release said restraining means from said thrusters.

7. In an aircraft, a fuselage having a door opening, a jettisonable stair door hinged to the jamb of said door opening for closing said door opening during flight, and for providing an entrance-exit stairway for said aircraft when landed, latch bars on said door, engageable with the jamb of said door for holding said door in closed position, spring operated thrusters secured to said door jamb for pushing said door outwardly, restraining means for said thrusters, explosively operated means for withdrawing said latch bars to release said door, said explosively operated means also operating to release said restraining means from said thrusters, explosive hinge bolts on said door, trigger means for exploding said explosive bolts to release said door from said aircraft, said trigger means being located below said door, and electrically operated by contact of the downwardly swinging door.

8. In an aircraft, a jettisonable stair door, hinged to the body of said aircraft, latch bars on said door for holding said door in closed position, explosive means for emergency release of said latch bars, a pair of cables secured at one end of each to the body of the aircraft, and at the other end to the stair for holding said stair in operative position when said aircraft is on the ground and said door is open said cables also constituting handrails, spring operated kicker plungers for pushing said door outwardly, spring operated kicker plungers for separating said cables from said aircraft, means for restraining all of said kicker plungers, pulley and cable means for releasing said restraining means operated by said explosively operated means to push said door open and to free said cables from said aircraft when said latches are released.

9. In an aircraft, a fuselage having a door opening, a stair door secured by hinges to the lower jamb of said opening, adapted for normal closure of said opening and adapted further to provide a stairway for entrance and exit while said aircraft is on the ground, latch means for securing said stair door in closed position, emergency means explosively operable during flight for releasing said latch means, kicker means for pushing said door from said jamb and explosive means located on said fuselage beneath said door opening and operable by contact with said door for severing said hinges and jettisoning said stair door.

References Cited in the file of this patent
UNITED STATES PATENTS

| | | |
|---|---|---|
| 2,453,937 | Ray | Nov. 16, 1948 |
| 2,556,672 | Bergh et al. | June 12, 1951 |
| 2,666,092 | Balzer | Jan. 12, 1954 |
| 2,797,884 | Peed | July 2, 1957 |

OTHER REFERENCES

"Flight" issue of Oct. 22, 1954, page 613.